United States Patent
Shen

(10) Patent No.: US 7,369,315 B2
(45) Date of Patent: May 6, 2008

(54) BEAM SPLITTER AND OPTICAL IMAGING SYSTEMS INCORPORATING SAME

(75) Inventor: Dar Tson Shen, West Vancouver (CA)

(73) Assignee: Pacific Telescope Corp., Richmond, British Columbia (CA)

(*) Notice: Subject to any disclaimer, the term of this patent is extended or adjusted under 35 U.S.C. 154(b) by 27 days.

(21) Appl. No.: 11/351,276

(22) Filed: Feb. 8, 2006

(65) Prior Publication Data
US 2006/0180744 A1    Aug. 17, 2006

Related U.S. Application Data

(63) Continuation-in-part of application No. PCT/CN2005/000179, filed on Feb. 6, 2005.

(51) Int. Cl.
  G02B 27/10 (2006.01)
  G02B 9/00 (2006.01)
  G02B 9/08 (2006.01)

(52) U.S. Cl. .......................... 359/629; 359/738

(58) Field of Classification Search ................ 359/629, 359/634, 636, 232, 583, 738–739, 399, 403, 359/419, 431
See application file for complete search history.

(56) References Cited

U.S. PATENT DOCUMENTS

| 3,968,362 | A |  | 7/1976 | Mocker |
| 4,131,919 | A |  | 12/1978 | Lloyd et al. |
| 4,163,256 | A |  | 7/1979 | Adcock |
| 4,420,773 | A |  | 12/1983 | Toyoda et al. |
| 4,478,513 | A | * | 10/1984 | Skinner et al. ............ 356/323 |
| 4,586,190 | A |  | 4/1986 | Tsuji |
| 4,735,497 | A | * | 4/1988 | Elterman .................... 359/385 |
| 5,365,367 | A | * | 11/1994 | Zehnpfennig et al. ...... 359/399 |
| 5,450,240 | A | * | 9/1995 | Hall et al. ................... 359/613 |
| 6,937,356 | B1 |  | 8/2005 | Ito et al. |
| 2006/0001762 | A1 |  | 1/2006 | Chou et al. |

FOREIGN PATENT DOCUMENTS

| JP | 2240532 | 9/1990 |
| JP | 02240532 | 9/1990 |
| JP | 6097034 | 4/1994 |
| SU | 761847 | 7/1980 |

OTHER PUBLICATIONS

Advertisment and specification for Super Telephoto Digital Camera Scope TD 1 Spotting Scope/DSC (undated)—Kowa Company Ltd. (6 pages).

* cited by examiner

Primary Examiner—Alicia M Harrington
(74) Attorney, Agent, or Firm—Oyen Wiggs Green & Mutala LLP

(57) ABSTRACT

An optical imaging system incorporates a beam splitter, which is moveable to a beam-splitting position where the beam splitter intercepts the light on an input optical path and a non-beam-splitting position where the beam splitter is located outside of the input optical path. The beam splitter includes a body penetrated by an aperture and a reflective surface surrounding the aperture. When the beam splitter is located in the beam-splitting position, a portion of the light in the optical path is transmitted through the aperture and a portion of the light in the optical path is reflected from the reflective surface.

40 Claims, 9 Drawing Sheets

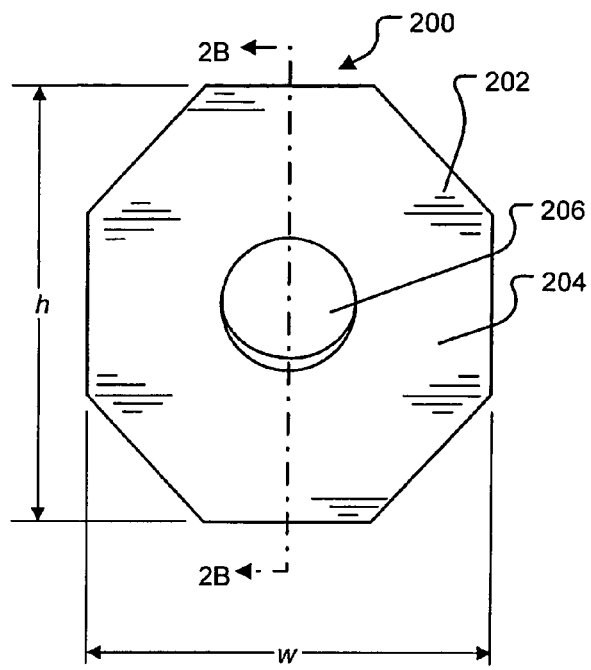
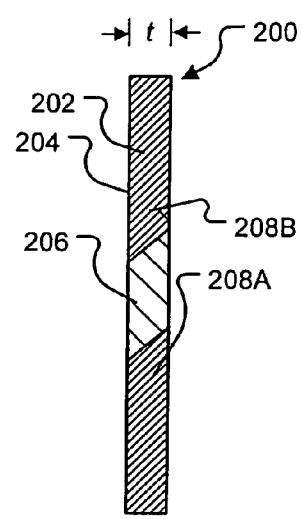
FIGURE 2B
FIGURE 2A
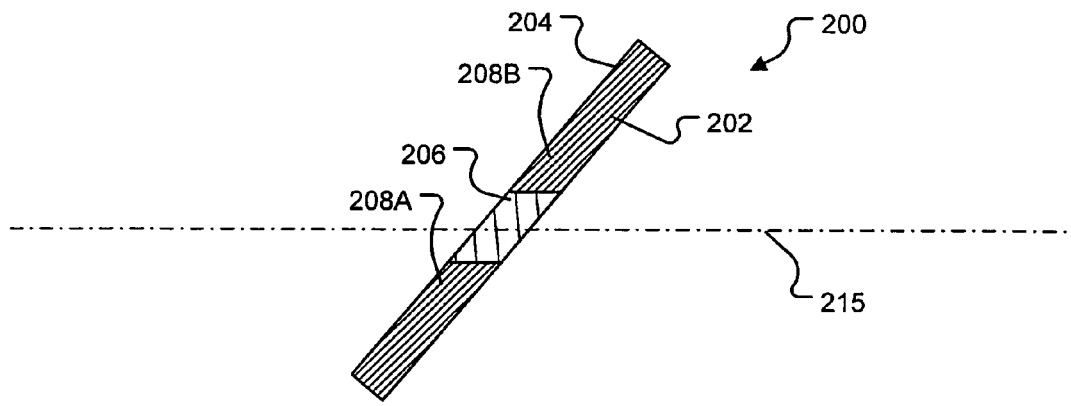
FIGURE 2C

BEAM-SPLITTING CONFIGURATION

BEAM SPLITTER AND OPTICAL IMAGING SYSTEMS INCORPORATING SAME

RELATED APPLICATIONS

This application is a continuation in part of PCT application No. PCT/CN2005/000179 which is hereby incorporated herein by reference.

TECHNICAL FIELD

This invention relates to optical imaging systems such as telescopes. Particular embodiments of the invention provide optical imaging systems which incorporate selectively operable non-optical path length difference beam splitters.

BACKGROUND

Optical imaging systems, such as digital imaging telescopes, can provide different optical paths to direct light for different applications. FIG. 1A schematically illustrates a typical prior art digital imaging telescope 10. Digital imaging telescope 10 has a telescope body 12 which defines a primary optical cavity 13. Primary optical cavity 13 houses an objective lens system 14, an erecting prism system 16 and an eyepiece 18. Eyepiece 18 houses an eyepiece lens system 20 which provides a magnified image to a user's eye. Telescope body 12 also defines an optical cavity 24 which houses a secondary objective lens 22 and a digital imaging system 26. Digital imaging system 26 is typically implemented using charge-coupled-device (CCD) technology or complementary metal-oxide semiconductor (CMOS) technology.

Digital imaging telescope 10 provides two light paths 30, 32. Light on path 30 travels through objective lens 14 into primary optical cavity 13 and is focused at point F1 in front of eyepiece lens system 20. Light on path 30 allows users to view objects through eyepiece 18. Light on path 32 travels through objective lens 22 into secondary optical cavity 24 and is focused at point F2 to provide light to digital imaging system 26. Digital imaging system 26 digitizes images to generate digital image data.

Digital imaging telescope 10 suffers from the drawback that it requires two objective lenses 14, 22, each having relatively low f/#s which tends to be expensive. Also, the characteristics of objective lens 22 (e.g. aperture, focal length and f/#) and the optical path length of light path 32 are different from the characteristics of objective lens 14 and the optical path length of light path 30. Consequently, the images digitized by digital imaging system 26 differ from the images observed by a user through eyepiece 18. Furthermore, the digital magnification range provided by the digital zoom of digital imaging system 26 is limited by the focal length of secondary objective lens 22. For example, if the focal length of secondary lens 22 is 100 mm and the digital zoom capability of digital imaging system 26 is 5×, then the total digital magnification range of digital imaging system 26 is equivalent to that of an objective lens having a focal length in a range of 100 mm-500 mm.

FIG. 1B schematically illustrates a different prior art digital imaging telescope 110. Digital imaging telescope 110 is similar to digital imaging telescope 10, except that digital imaging telescope 110 uses a single objective lens 114 to provide light to eyepiece 118 and to digital imaging system 126. This light sharing is accomplished in digital imaging telescope 110 by a beam splitter 134 and a flat mirror 128. Beam splitters are well known optical devices and can be fabricated by providing a partially reflective coating between a pair of triangular prisms. Light from optical path 130 which impinges on beam splitter 134 is split into a first component 130A, which continues onward through erecting prism 116 to eyepiece 118 (point F1), and a second component 130B, which emerges from beam splitter 134 at a 90° angle, reflects from flat mirror 128 and then travels to digital imaging system 126 (point F2).

While beam splitter 134 eliminates the need for a second objective lens, the introduction of beam splitter 134 splits the light that is collected by objective lens 114 (i.e. into components 130A, 130B). Consequently, components 130A and 130B each contain only a fraction of the light that is collected by objective lens 114. For a given objective lens 114, the introduction of beam splitter 134 reduces the amount of light available at eyepiece 118, which in turn reduces brightness, contrast and resolution.

Because the index of refraction of the glass used in beam splitter 134 ($n_{glass}$) is greater than that of air ($n_{air} \approx 1$), the introduction and/or withdrawal of beam splitter 134 into light path 130 also changes the optical path length of light traveling between objective lens 114 and eyepiece 118 and between objective lens 114 and digital imaging system 126. Assuming that the thickness of an optical path through beam splitter 134 is L, then the optical path length through beam splitter 134 will be $OPL_{splitter}=L/n_{glass}$ and the reduction in optical path length caused by the introduction of beam splitter 134 will be $\Delta OPL=L-L/n_{glass}$. Assuming $n_{glass}=1.5$, this results in $OPL_{splitter}=0.67L$ or a reduction in optical path length of $\Delta OPL=L-0.67L=0.33L$.

Furthermore, telescope 110 suffers from the same limitations as telescope 10 with respect to its digital magnification range. The digital magnification range provided by the digital zoom of digital imaging system 126 is limited by the focal length of objective lens 114. Another drawback with telescope 110 is that the partially reflective surface of beam splitter 134 can cause a loss of true color and scattering which can induce light decay.

There is a general desire to provide optical imaging systems which address or ameliorate some of the disadvantages discussed above.

BRIEF DESCRIPTION OF DRAWINGS

In drawings which show non-limiting embodiments of the invention:

FIG. 2A is an isometric view of a beam splitter according to a particular embodiment of the invention;

FIG. 2B is a cross-sectional view of the FIG. 2A beam splitter taken along the line 2B-2B;

FIG. 2C is a cross-sectional view of the FIG. 2A beam splitter taken along the line 2B-2B where the beam splitter is oriented at a particular angle;

DESCRIPTION

Figure 1A:
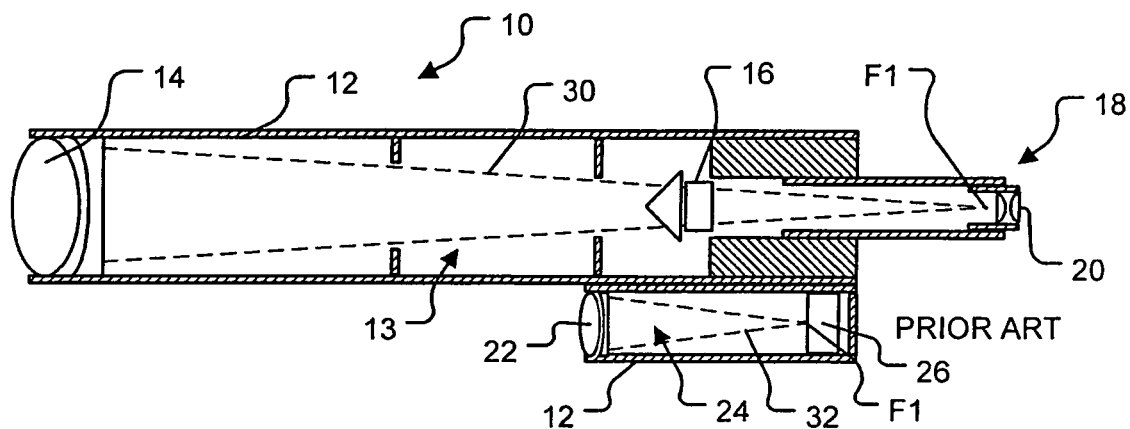
FIG. 1A is a schematic sectional view of a first type of prior art digital imaging telescope.
Figure 1B:
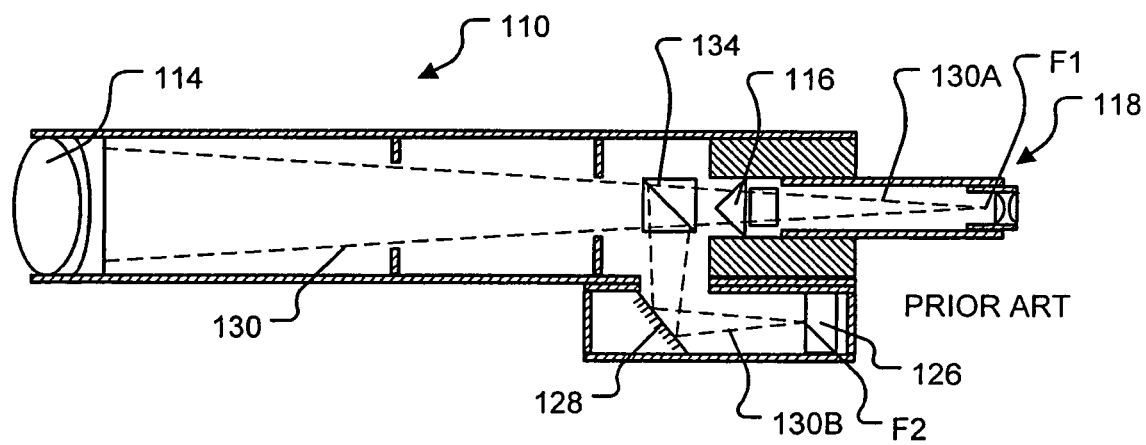
FIG. 1B is a schematic sectional view of a second type of prior art digital imaging telescope.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

FIGS. 2A, 2B and 2C depict a beam splitter 200 according to a particular embodiment of the invention. Beam splitter 200 comprises a body 202 having (or coated with) a reflective surface 204. Reflective surface 204 preferably has a high reflectance (as opposed to the partially reflective surface used in prior art beam splitters) Various types of reflective coatings including metallic coatings, oxide-based coatings and dielectric layer coatings may be used to fabricate reflective surface 204. In some embodiments, the reflectance of reflective surface 204 is over 89% over at least 80% of the visible spectrum. In other embodiments, this reflectance is over 95%.

Body 202 of beam splitter 200 defines an aperture 206. By way of non-limiting example, beam splitter 200 may be fabricated by boring an aperture into a front-reflection mirror or by coating a surface of an apertured body with a reflective coating.

In the illustrated embodiment, body 202 of beam splitter 200 is octagonally shaped, but this is not necessary. Beam splitter 200 may be circular or may have some other shape. Preferably, as shown in FIGS. 2A, 2B and 2C, the height (h) and width (w) of beam splitter 200 are large in comparison to its thickness (t). Where the body 202 of beam splitter 200 is circular, its diameter (d) is preferably relatively large in comparison to its thickness (t). In some embodiments, the ratios h/t, w/t and/or d/t are greater than 5:1. In other embodiments, these ratios are greater than 10:1.

In the illustrated embodiment, aperture 206 is generally circular, but this shape is not necessary. The cross-sectional area of aperture 206 compared to the surface area of reflective surface 204 depends on the relative amount of reflection and transmission required from beam splitter 200. In some embodiments, the ratio of the area of aperture 206 to the area of reflective surface 204 is in a range of 1:20 (5%) to 1:3 (33%). This ratio may be outside of this range for particular applications.

Preferably, as shown in FIGS. 2B and 2C, aperture 206 is defined by one or more edges 208A, 208B (collectively, edges 208). Edges 206 (or portions thereof) may be beveled with respect to reflective surface 204 to form a non-orthogonal angles therewith. As explained in more detail below, the angle of edges 208 with respect to reflective surface 204 can be selected to minimize the interference of edges 208 with the transmitted beam. In general, the preferred angle of edges 208 with respect to reflective surface 204 will depend on the angle with which beam splitter 200 is oriented with respect to the optical axis 215 (FIG. 2C) of a given optical system. Preferably, aperture-defining edges 208 are configured to be parallel to optical axis 215 while reflective surface 204 is oriented at a non-orthogonal angle with respect to optical axis 215 (i.e. as if edges 208 were the edges of a cylinder that penetrated reflective surface 204 and body 202 at a non-orthogonal angle). In such embodiments, the angle between reflective surface 204 and edges 208 may be substantially similar to the angle between reflective surface 204 and optical axis 215. In some embodiments, beam splitter 200 is oriented such that both beveled edges 208 and optical axis 215 form a 45° with reflective surface 204.

Figure 3A:
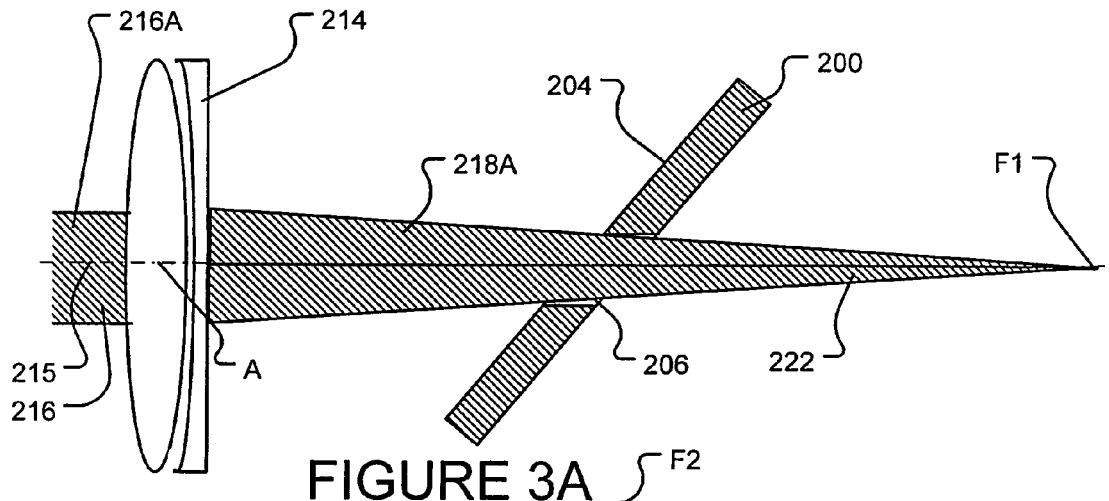
FIG. 3A is a schematic depiction showing how light is transmitted through the FIG. 2A beam splitter.
Figure 3B:
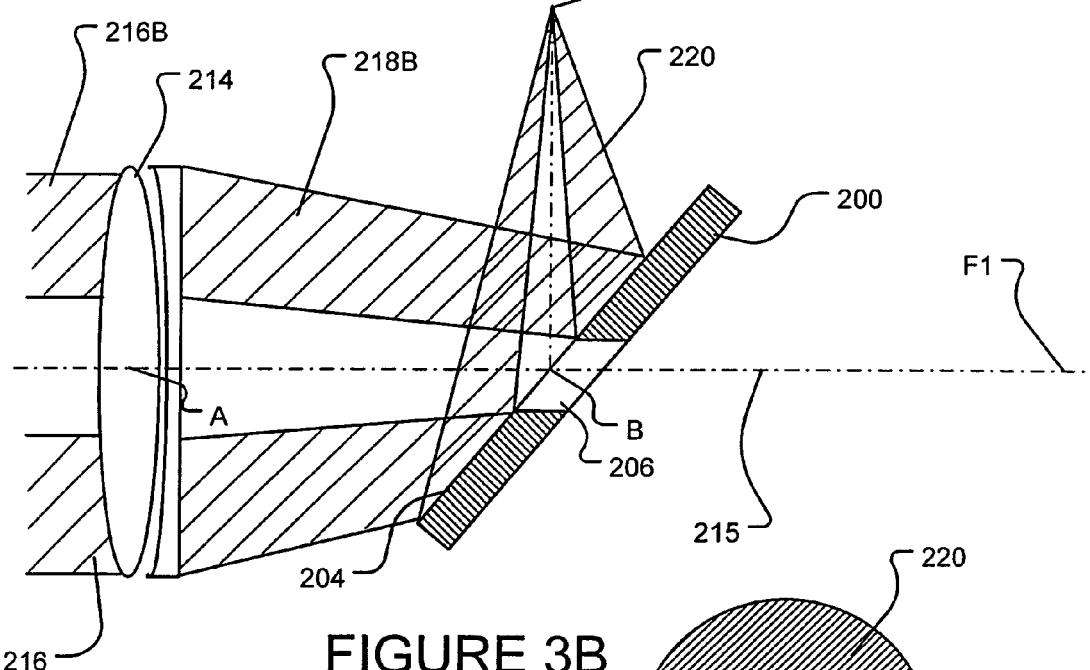
FIG. 3B is a schematic showing how light is reflected from the FIG. 2A beam splitter.
Figure 3C:
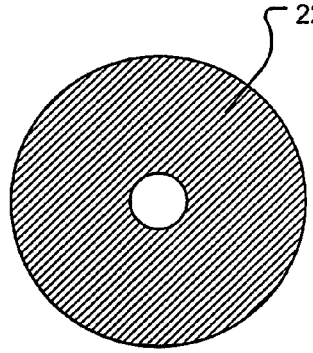
FIG. 3C is a schematic depiction of the radiation profile of the light reflected from the FIG. 2A beam splitter.

FIGS. 3A, 3B and 3C schematically depict the operation of beam splitter 200. FIG. 3A depicts a portion 216A of incident light 216 which is transmitted by beam splitter 200. Portion 216A of incident light 216 impinges on objective lens 214. Objective lens 214 refracts incident light portion 216A and creates a converging light beam within a region 218A. The converging light beam in region 218A converges toward focal point F1. Beam splitter 200 is preferably positioned such that aperture 206 is centered on optical axis 215. When the converging light beam within region 218A reaches beam splitter 200, it is sufficiently narrow to be transmitted directly through aperture 206 of beam splitter 200. This light is transmitted by beam splitter 200 as beam 222. Because the air in aperture 206 has the same index of refraction as the air in the surrounding region, the optical path length of transmitted light beam 222 is not altered by the presence or absence of beam splitter 200.

Preferably, as discussed above, aperture-defining edges 208 (FIGS. 2B, 2C) are configured such that they are parallel to optical axis 215 when beam splitter 200 is deployed. In some embodiments, aperture-defining edges 208 may converge between reflective surface 204 and the opposing surface of body 202 where the light captured by objective lens system 214 is also converging. In the illustrated embodiment, reflective surface 204 of beam splitter 200 is oriented at 45° with respect to optical axis 215 and edges 208 are configured to be parallel to optical axis 215.

FIG. 3B depicts a portion 216B of incident light 216 which is reflected by beam splitter 200. Incident light portion 216B impinges on objective lens 214 which refracts incident light portion 216B and creates a converging light beam in region 218B. The converging light beam in region 218B begins to converge toward focal point F1. However, the converging light in region 218B impinges on reflective surface 204 of beam splitter 200 and is reflected toward focal point F2 as reflected beam 220. Because the light in region 218B is reflected (i.e. without entering beam splitter 200), the optical path length of reflected beam 220 is not altered by the presence or absence of beam splitter 200. The axial path length between points A, B and F1 may be substantially similar to the optical axial path length between points A, B and F2. The cross-sectional profile of reflected beam 220 is shown in FIG. 3C.

The relative amounts of light transmitted by beam splitter 200 (in transmitted beam 222) and reflected by beam splitter 200 (in reflected beam 220) depend on the relative areas of aperture 206 and reflective surface 204 as projected onto a plane perpendicular to optical axis 215. Selection of the relative areas of aperture 206 and reflective surface 204 will typically depend on the applications for which the transmitted light 222 and reflected light 220 are intended to be used. In some applications, it may be desirable that there be a relatively large amount of light in reflected beam 220, while the amount of light in transmitted beam 222 is not required to be as large. In such applications, aperture 206 can be correspondingly small relative to reflective surface 204. Conversely, in applications where it is desirable that transmitted beam 222 be relatively intense and reflected beam 220 is not required to be as intense, aperture 206 can be correspondingly large relative to reflective surface 204. As discussed above, in some embodiments, the ratio of the area of aperture 206 to the area of reflective surface 204 is in a range of 1:20 (5%) to 1:3 (33%), but may be outside of this range for particular applications.

Figure 4A:
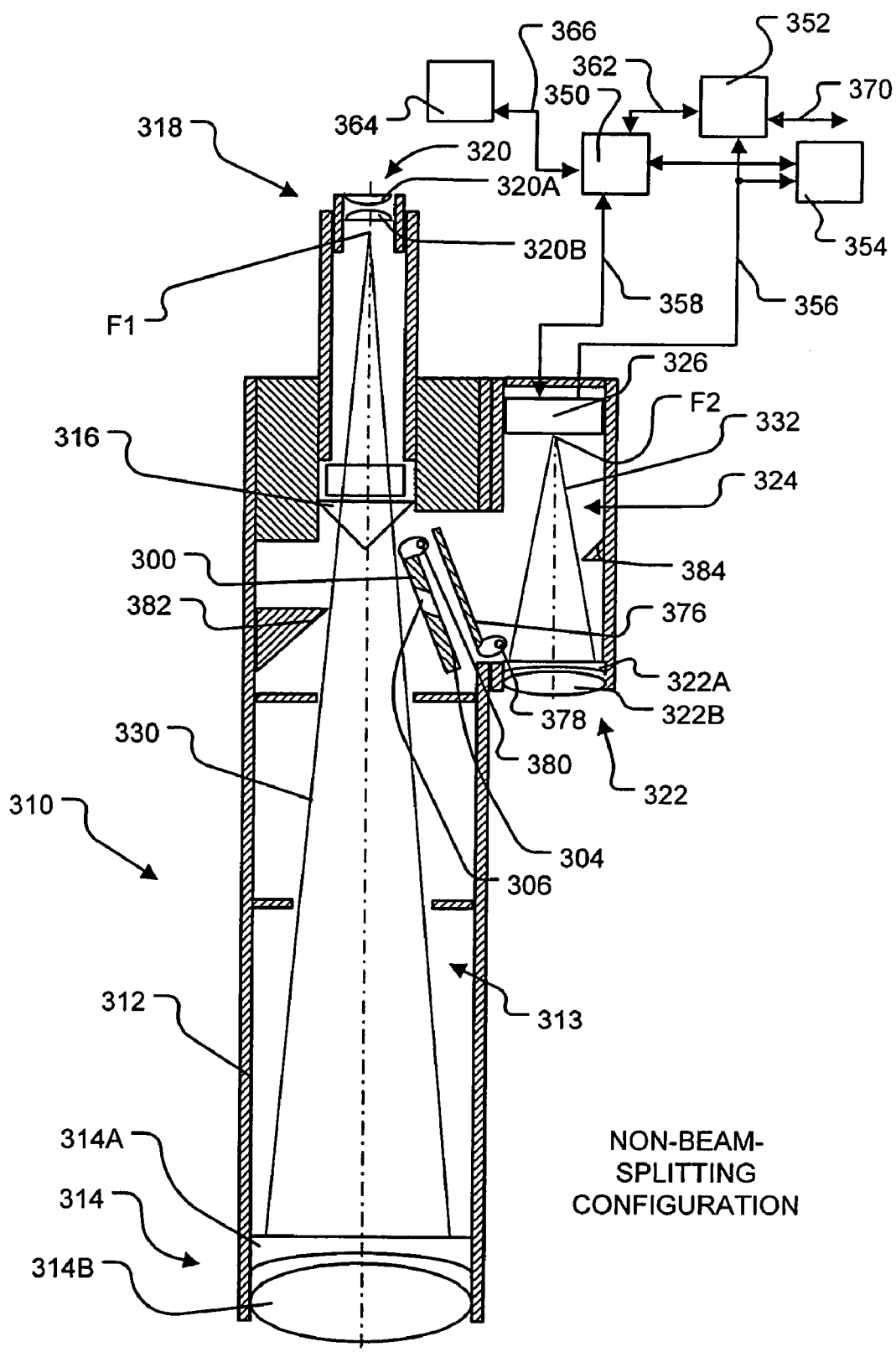
FIG. 4A is a schematic sectional view of a digital imaging telescope according to a particular embodiment of the invention in a non-beam-splitting configuration.
Figure 4B:
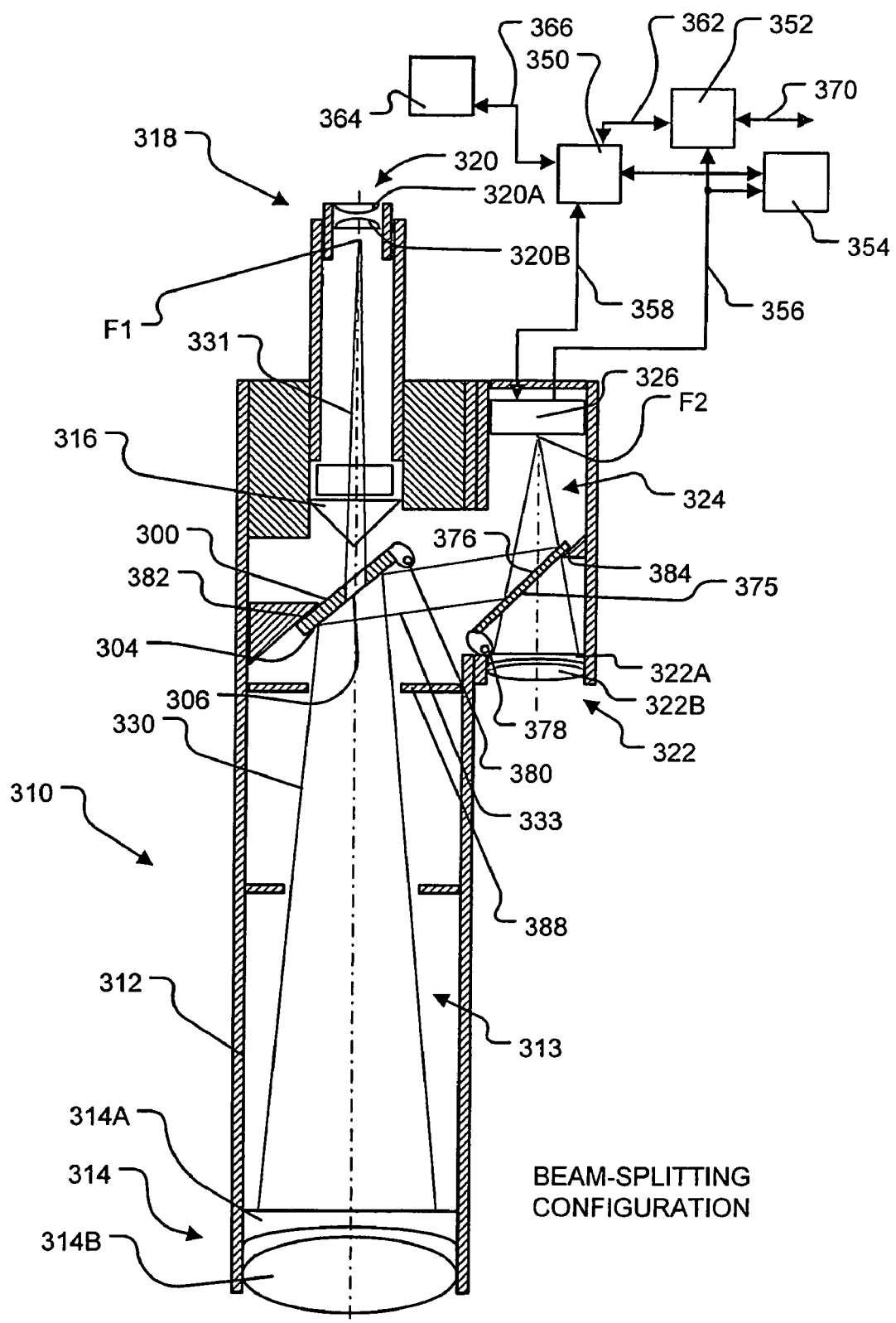
FIG. 4B is a schematic sectional view of the FIG. 4A digital imaging telescope in a beam-splitting configuration.

Beam splitter 200 may be used in a digital imaging system, such as a digital imaging telescope. FIGS. 4A and 4B schematically depict a digital imaging telescope 310 according to a particular embodiment of the invention. For clarity, FIGS. 4A and 4B omit some components which are common in digital imaging systems. Telescope 310 incorporates a beam splitter 300 of the type shown in FIGS. 2A-2C and 3A-3B. Telescope 310 may be switched between a non-beam-splitting configuration (FIG. 4A) and a beam-splitting configuration (FIG. 4B). In the beam-splitting configuration, beam splitter 300 is located in optical path 330 between objective lens 314 and eyepiece 318 so that light that enters objective lens 314 is split between eyepiece 318 and digital imaging system 326. In the non-beam-splitting configuration, beam splitter 300 is removed from optical path 330 so that substantially all of the light that enters objective lens 314 is provided to eyepiece 318.

Telescope 310 incorporates a telescope body 312 which defines a primary optical cavity 313. Primary optical cavity 313 houses a primary objective lens system 314, an optional erecting prism system 316 and an eyepiece 318. Eyepiece 318 incorporates an eyepiece lens system 320 which provides a magnified image to a user's eye (not shown). In the illustrated embodiment, primary objective lens system 314 comprises a pair of lenses 314A, 314B which together act as a converging optical system with a focal point F1. Objective lens system 314 may alternatively comprise different numbers and types of lenses which function in a similar manner. In some embodiments, objective lens system may have an F/# in the range of 1-10 and/or a focal length in the range of 50 mm-1500 mm. Like objective lens system 314, eyepiece lens system 320 is shown as having a pair of individual lenses 320A, 320B, but may generally comprise any number and type of lenses that provide magnification to the users' eye. To provide such magnification, eyepiece lens system 318 preferably has a focal length that is significantly shorter than that of objective lens system 314.

As is known in the art, optional erecting prism system 316 inverts the image on a pair of orthogonal axes, so that the image visible to the user's eye at eyepiece 318 has the same orientation as the scene visible to the user's naked eye. Non-limiting examples of suitable erecting prism systems 316 include a pair of orthogonally-oriented Porro prisms, an Amici (roof) prism and the like. In some embodiments, the inverting function of erecting prism system 316 may be implemented using a relay lens system. Erecting prism system 316 is not necessary. For example, where telescope 310 is used to view celestial objects (e.g. stars and planets), it is not normally necessary that telescope 310 provide erect images to the user's eye and prism system 316 may not be required.

Telescope body 312 also defines a secondary optical cavity 324 which houses a secondary objective lens system 322 and a digital imaging system 326. In the illustrated embodiment, secondary objective lens system 322 comprises a pair of lenses 322A, 322B which together act as a converging optical system with a focal point F2. Secondary objective lens system 322 may alternatively comprise different numbers and types of lenses which function in a similar manner. In some embodiments, objective lens system may have an F/# in the range of 1-10 and/or a focal length in the range of 20 mm-500 mm.

Digital imaging system 326 functions to digitize images to provide digital data representing images that are imaged by imaging system 326. Digital imaging system 326 may be implemented using charge coupled device (CCD) sensor technology, complementary metal-oxide semiconductor (CMOS) sensor technology, active pixel sensors (APS) technology or any other suitable digital imaging technology. Digital imaging systems are well known in the art and are disclosed, by way of non-limiting example, in U.S. Pat. Nos. 4,131,919; 4,163,256; 4,420,773; and 6,937,356, which are hereby incorporated herein by reference.

Telescope 310 optionally comprises a controller 350 which may control digital imaging system 326 by way of interface 358. Controller 350 may be located within telescope body 312 or may be located external to telescope body 312. Controller 350 may generally incorporate any processor or group of processors capable of providing the functionality described herein and may include, without limitation, embedded microprocessors, dedicated computers, groups of data processors or the like. Preferably, controller 350 is capable of executing program instructions. In some embodiments, controller 350 is provided by a independent device (e.g. a computer) which is separate from telescope 310. In some embodiments, controller 310 is incorporated into digital imaging system 326. A user may control various aspects of digital imaging system 326 via user interface 364. User interface 364 may communicate with controller 350 via interface 366.

Digital imaging system 326 may be capable of providing digital image data to one or more memory element(s) 352 and/or to video output display 354 via interface 356. Memory element(s) 352 may comprise any suitable memory (e.g. solid state, optical or magnetic) and may be a part of telescope 310 or external to telescope 310. Controller 350 may use interface 358 and/or interface 362 to trigger digital imaging system 326 and/or memory element(s) 352 to digitize and/or store photographic and/or video image(s) in memory element(s) 352. Controller 350 may initiate this functionality automatically and/or in response to a user-initiated signal from user interface 364. In embodiments where memory element(s) 352 are a part of telescope 310, memory element(s) 352 are preferably removable from telescope 310 or telescope 310 comprises a suitable interface 370 which allows the contents of memory element(s) 352 to be uploaded to a computer, external memory or the like. In some embodiments, a user may indirectly (via controller 350) or directly (bypassing controller 350) control various aspects of memory element(s) 352 via user interface 364.

Video output display 354 may comprise a liquid crystal (LCD) display or any other suitable video display. Video output display 354 may display images corresponding to those which are being digitized by digital imaging system 326 or may display images from memory element 352. As is known in the art, a user may indirectly (via controller 350) or directly (bypassing controller 350) control various aspects of display 354 (e.g. digital zoom, image selection and the like) via user interface 364.

Telescope 310 incorporates a beam splitter 300 of the type illustrated in FIGS. 2A-2C and 3A-3B and an additional flat mirror 376. Beam splitter 300 is moveable between a first, beam-splitting position corresponding to the beam-splitting configuration of telescope 310 (FIG. 4B) and a second, non-beam-splitting position corresponding to the non-beam-splitting configuration of telescope 310 (FIG. 4A). In the beam-splitting position, beam-splitter 300 intercepts and splits the light in optical path 330 between eyepiece 318 and digital imaging system 326. In the non-beam-splitting position, beam-splitter 300 is located outside of the light in optical path 330 and substantially all of the light in optical path 330 is provided to eyepiece 318. Mirror 376 is similarly moveable between a first, beam-splitting position (FIG. 4B) and a second, non-beam-splitting position (FIG. 4A). As explained in more detail below, when beam splitter 300 and mirror 376 are in their beam-splitting positions, beam splitter 300 and mirror 376 cooperate to direct light from objective lens system 314 to digital imaging system 326.

In the illustrated embodiment, beam splitter 300 is pivotable between its beam-splitting and non-beam-splitting positions about pivot joint 380 and mirror 376 is pivotal between its beam-splitting and non-beam-splitting positions about pivot joint 378. In other embodiments, beam splitter 300 and mirror 376 are moveable by translation or by a combination of translation and rotation. Telescope 310 may incorporate one or more actuators (not shown) and one or more corresponding mechanisms (not shown) which effect movement of beam splitter 300 and mirror 376 between their beam-splitting and non-beam-splitting positions. Non-limiting examples of suitable actuators include electric motors, solenoid switches and the like. Those skilled in the art will appreciate that there are a wide variety of suitable actuators and mechanisms capable of moving beam splitter 300 and mirror 376 between their beam-splitting and non-beam-splitting positions. Biasing systems (not shown) may be operatively connected to these actuators and/or mechanisms such that beam-splitter 300 and mirror 376 are biased toward one or both of their beam-splitting and non-beam-splitting positions.

In some embodiments, telescope 310 incorporates one or more hand-actuatable mechanisms (not shown), which allow a user to effect movement of beam splitter 300 and mirror 376 between their beam-splitting and non-beam-splitting positions. Non-limiting examples of suitable hand-actuatable mechanisms include a scissor-hinge having a push tab or slider tab, a pair of individual push tabs or slider tabs that provide torque about pivot joints 378, 380 or the like. Biasing systems (not shown) may be operatively connected to these hand-actuatable mechanisms such that beam-splitter 300 and mirror 376 are biased toward one or both of their beam-splitting and non-beam-splitting positions.

Telescope 310 may incorporate an optional stop surface 382. When beam splitter 300 is precisely located in its beam-splitting position, a portion of beam splitter 300 abuts against stop surface 382 and stop surface 382 stops movement of beam splitter 300. A biasing mechanism (not shown) may bias beam splitter 300 against stop surface 382. Telescope 310 may also incorporate an optional stop surface 384 for mirror 376. When mirror 376 is precisely located in its beam-splitting position, a portion of mirror 376 abuts against stop surface 384 and stop surface 384 stops movement of mirror 376. A biasing mechanism (not shown) may bias mirror 376 against stop surface 384. Preferably, stop surfaces 382, 384 are stationary (rather than moving with beam splitter 300 and mirror 376). Preferably, stop surfaces 382, 384 are sized such that they do not interfere with the passage of light from objective lens system 314 to eyepiece 318 or from objective lens system 322 to digital imaging system 326.

Figure 6A:
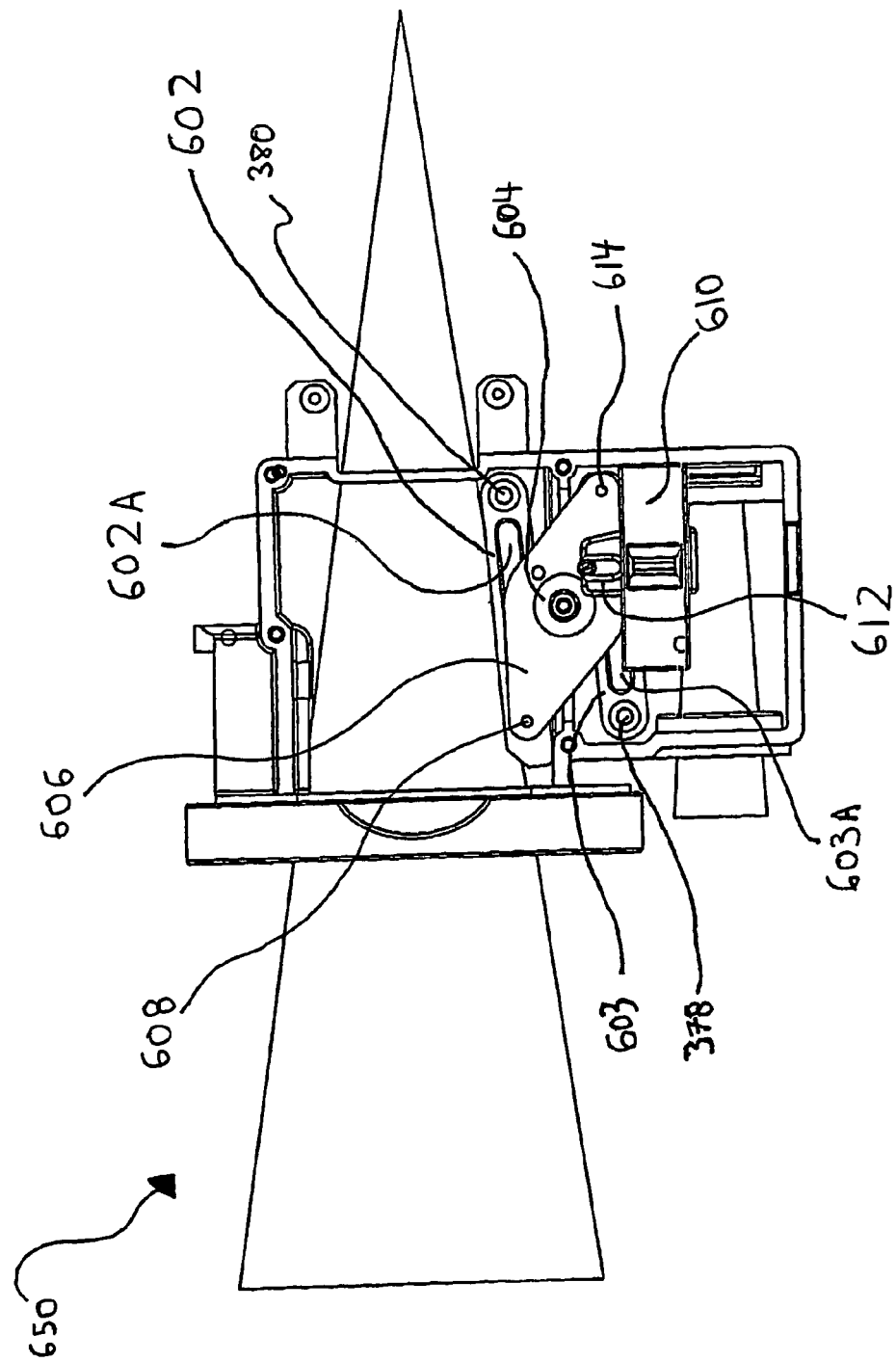
FIG. 6A is a schematic partial view of a beam-splitter-moving mechanism suitable for use with the telescopes of FIGS. 4A-4B in a non-beam-splitting configuration.
Figure 6B:
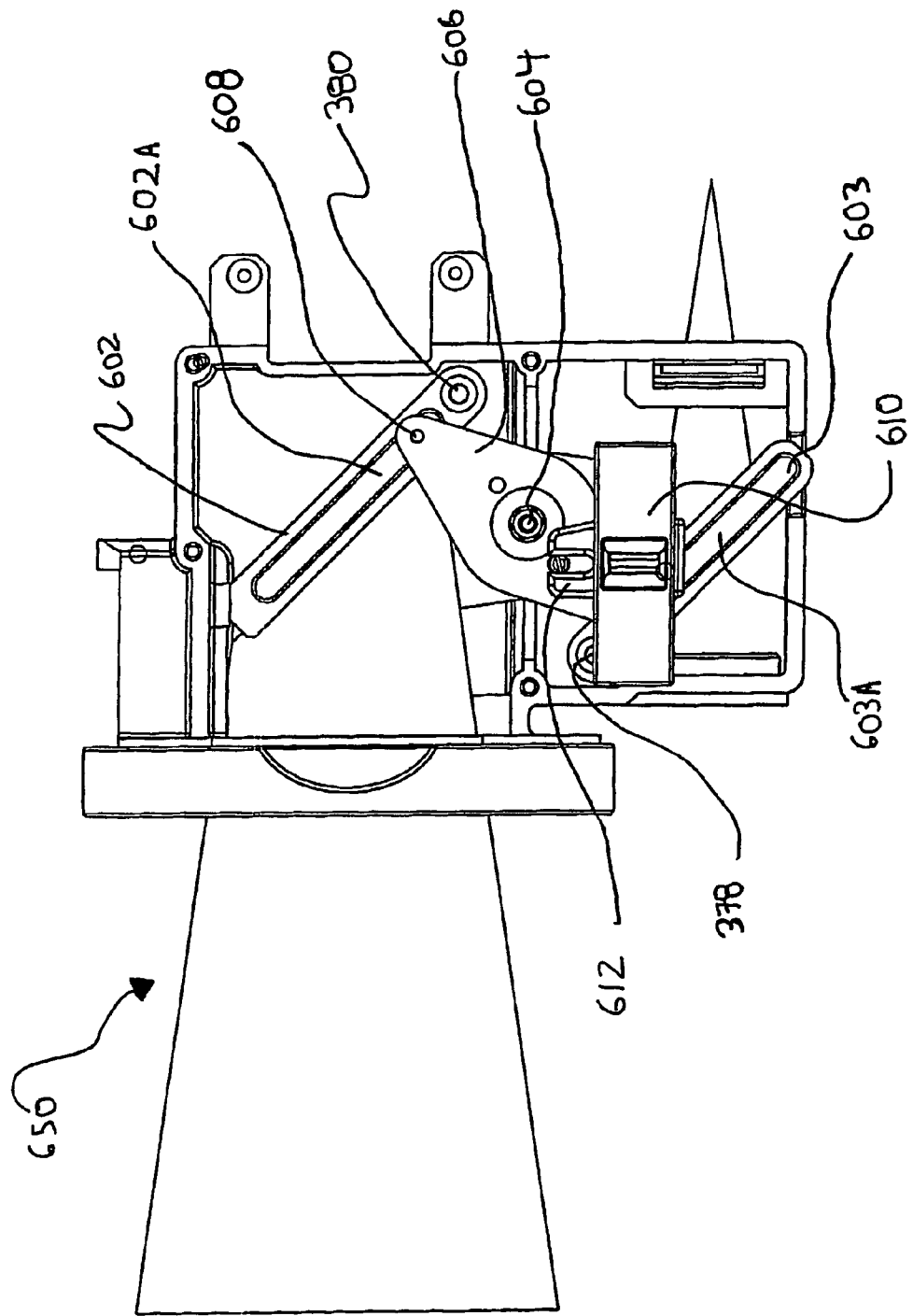
FIG. 6B is a schematic partial view of the FIG. 6A beam-splitter-moving mechanism in a beam-splitting configuration.

FIGS. 6A and 6B schematically depict a hand-actuatable mechanism 650 for moving beam splitter 300 and mirror 376 between their beam-splitting and non-beam-splitting positions. FIG. 6A depicts mechanism 650 in its non-beam-splitting configuration and FIG. 6B depicts mechanism 650 in its beam-splitting configuration. Mechanism 650 is operated by a hand-actuatable push-tab 610. Push-tab 610 is coupled (via connector 612) to pivot member 606 in a location spaced apart from pivot joint 604, such that translation of push-tab 610 causes pivotal movement of pivot member 606 about pivot joint 604. A first end of pivot member 606 is coupled to bracket 602 at coupling 608, such that coupling 608 is capable of moving in bracket channel 602A. Bracket 602 holds beam splitter 300. A second end of pivot member 606 is coupled to bracket 603 at coupling 614, such that coupling 614 is capable of moving in bracket channel 603A. Bracket 603 holds mirror 376.

To move mechanism 650 from the non-beam-splitting configuration of FIG. 6A to the beam-splitting configuration of FIG. 6B, a user pushes push-tab 610 leftwardly. When a user pushes push tab 610 in a leftward direction, pivot member 606 pivots clockwise about pivot joint 604 and coupling 608 moves rightwardly within bracket channel 602A. The rightward movement of coupling 608 within bracket channel 602A causes bracket 602 (and beam splitter 300) to rotate in a clockwise direction about pivot joint 380. At the same time, when a user pushes push tab 610 in a leftward direction, pivot member 606 pivots clockwise about pivot joint 604 and coupling 614 moves leftwardly within bracket channel 603A. The leftward movement of coupling 6614 within bracket channel 603A causes bracket 603 (and mirror 376) to rotate in a clockwise direction about pivot joint 378. The ends of bracket channels 602A, 603A may act as stop surfaces that limit the movement of brackets 602, 603 and the corresponding movement of beam-splitter 300 and mirror 376.

To move mechanism 650 from the beam-splitting configuration of FIG. 6B to the non-beam-splitting configuration of FIG. 6A, a user pushes push-tab 610 rightwardly and the operation of mechanism 650 is basically the reverse of that described above.

In the non-beam-splitting configuration of FIG. 4A, telescope 310 has two separate light paths 330, 332. Light on path 330 travels through objective lens system 314 and is focused at point F1 in front of eyepiece lens system 320. Light on path 330 allows users to view objects through eyepiece 318. Because beam-splitter 300 does not interfere with the light on path 330 when telescope 310 is in its non-beam-splitting configuration, substantially all of the light collected by objective lens system 314 is focused at point F1 and is available to eyepiece 318 for observation by a user. Light on path 332 travels through objective lens system 322 and is focused at point F2 to provide light which is used by digital imaging system 326 to digitize images.

When telescope 310 is switched to its beam-splitting configuration (FIG. 4B), telescope 310 once again has two different light paths, except that both light paths originate from objective lens system 314. Light collected by objective lens system 314 enters primary optical cavity 313 on light path 330. When light on path 330 impinges on beam splitter 300, a first portion of this light is transmitted through aperture 306 and continues on path 331 to focal point F1. Light on path 331 allows users to view objects through eyepiece 318. A second portion of the light on path 330 is reflected from reflective surface 304 of beam splitter 300 along path 333, where it is reflected again from mirror 376 before being focused at focal point F2. Light reflected from beam splitter 300 (along path 333) is used by imaging system 326 to digitize images.

Advantageously, as discussed above, the insertion of beam splitter 300 into optical path 330 and the withdrawal of beam splitter 400 from optical path 430 do not change the optical path length of the transmitted beam on path 331 or the reflected beam on path 333. The combined optical path length of the transmitted beam on paths 330 and 331 of the FIG. 4B beam-splitting configuration and the combined optical path length of the reflected beam on paths 330 and 333 of the FIG. 4B beam-splitting configuration are the same as the optical path length of light on path 330 in the FIG. 4A non-beam-splitting configuration. Because there is no change in the optical path length between the beam-splitting and non-beam-splitting configurations, neither eyepiece 318 nor digital imaging system 326 requires focal adjustment to accommodate transitions of telescope 310 back and forth between its beam-splitting configuration and its non-beam-splitting configuration.

Light from secondary objective lens system 322 is not used when telescope 310 is in its beam-splitting configuration (FIG. 4B). Preferably, when telescope 310 is in its beam-splitting configuration, the light that enters secondary objective lens system 322 on path 332 is blocked by the non-reflective side 375 of mirror 376. Non-reflective side 375 of mirror 376 may be roughened and/or coated with a matte black material to minimize reflection therefrom.

Digital imaging system 326 may be capable of capturing and digitizing image data when telescope 310 is in either of its beam-splitting and/or non-beam splitting configurations. When telescope 310 is in its non-beam-splitting configuration, digital imaging system 326 receives light via secondary objective lens system 322 on path 332. When telescope 310 is in its beam-splitting configuration (FIG. 4B), digital imaging system 326 receives light via primary objective lens system 314 on paths 330 and 333. As discussed above, digital imaging system 326 may provide digital image data to memory element 352 and/or to video output display 354.

As is well known in the field of optics, for a given level of magnification, an optical imaging system having a relatively large aperture collects a relatively large amount of light and, when compared to a relatively low-apertured optical imaging system, provides a higher quality image that is brighter, has greater resolution and has higher contrast. However, the costs of manufacturing and purchasing objective lens systems having larger apertures tends to be more expensive than the costs of manufacturing and purchasing objective lens systems having lower apertures. As shown in FIGS. 4A and 4B, telescope 310 may comprise a primary objective lens system 314 that has an aperture significantly larger than that of secondary objective lens system 322. Because telescope 310 incorporates only one high aperture lens system (primary objective lens system 314), telescope 310 may be manufactured (and sold) less expensively. However, moveable beam splitter 300 allows a user to take advantage of high-aperture objective lens system 314 to provide superior quality images at eyepiece 318 (when telescope 310 is in its non-beam-splitting configuration) and superior quality images via imaging system 326 (when telescope 310 is in its beam-splitting configuration).

In general, when telescope 310 is in its beam-splitting configuration, the total amount of light available to digital imaging system 326 will depend on the relative size of aperture 306 and reflecting surface 304 of beam splitter 300. For particular applications, the size ratio of aperture 306 and reflective surface 304 may be adjusted to suit the light requirements at digital imaging system 326. Preferably, the relative size of aperture 306 and reflecting surface 304 of beam splitter 300 and the relative apertures of objective lens systems 314 and 322 are selected such that the amount of light available to imaging system 326 in the beam-splitting configuration is greater than the amount of light available to imaging system 326 in the non-beam-splitting configuration.

Advantageously, because digital imaging system 326 can capture images using both primary objective lens system 314 and secondary objective lens system 322, telescope 310 can provide digital imaging system 326 with improved digital magnification range. As shown in FIGS. 4A and 4B, primary objective lens system 314 may have a focal length that is greater than that of secondary objective lens system 322. If primary objective lens has a focal length of f1, secondary objective lens 322 has a focal length of f2 and digital imaging system 326 is capable of producing digital magnification of up to mX, then the range of digital magnification which can be created by digital imaging system 326 is as if there was an objective lens with an effective focal length in the set $\{f1f2 \leq f \leq mf2, f1 \leq f \leq mf1\}$. In preferred embodiments, $mf2 \geq f1$, such that the range of digital magnification which can be created by digital imaging system 326 is as if there was an objective lens with an effective focal length in the set $\{f1f2 \leq f \leq mf1\}$.

Light is also provided to eyepiece 318 when telescope 310 is in either of its beam-splitting and/or non-beam splitting configurations. When telescope 310 is in its non-beam-splitting configuration, eyepiece 318 receives substantially all of the light collected by objective lens system 314 on path 330. When telescope 310 is in its beam-splitting configuration, eyepiece 318 receives the light transmitted by beam splitter 300 on path 331. Advantageously, a user is capable of using eyepiece 318 to view images even when digital imaging system 326 is digitizing data. The light transmitted by beam splitter 300 on path 331 is less than the amount of light received at eyepiece 318 when telescope 310 is in its non-beam splitting configuration. In general, the relative amount of light received at eyepiece 318 when telescope 318 in its beam-splitting and non-beam-splitting configurations will depend on the relative size of aperture 306 and reflective surface 304 of beam splitter 300. For particular applications, the size ratio of aperture 306 and reflective surface 304 may be adjusted to suit the light requirements at eyepiece 318. In some applications (e.g. in day time viewing or where the scene being viewed is bright), it may be preferable for users to view objects at eyepiece 318 when telescope 310 is in its beam-splitting configuration.

Figure 5A:
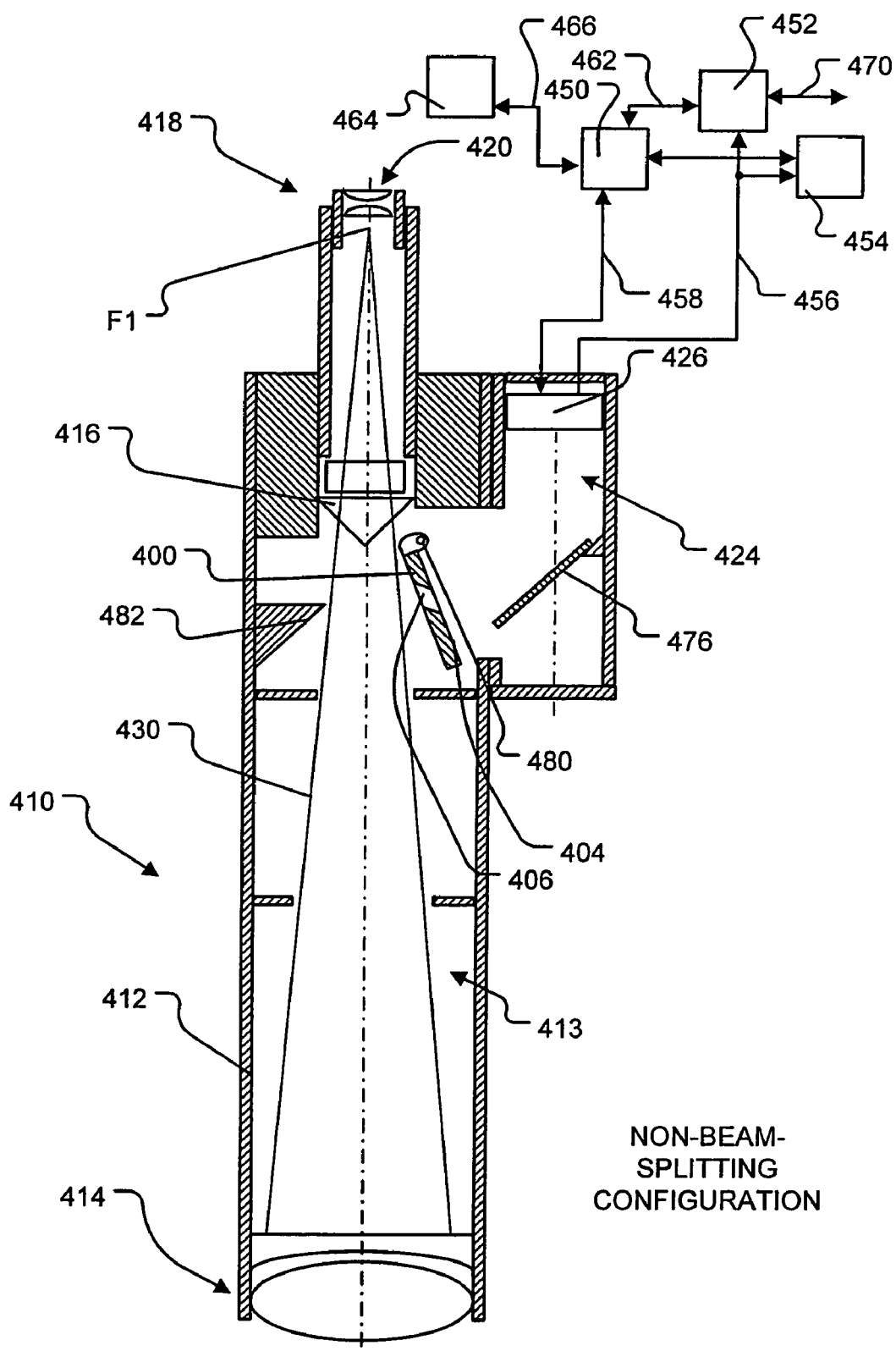
FIG. 5A is a schematic sectional view of a digital imaging telescope according to another embodiment of the invention in a non-beam-splitting configuration.
Figure 5B:
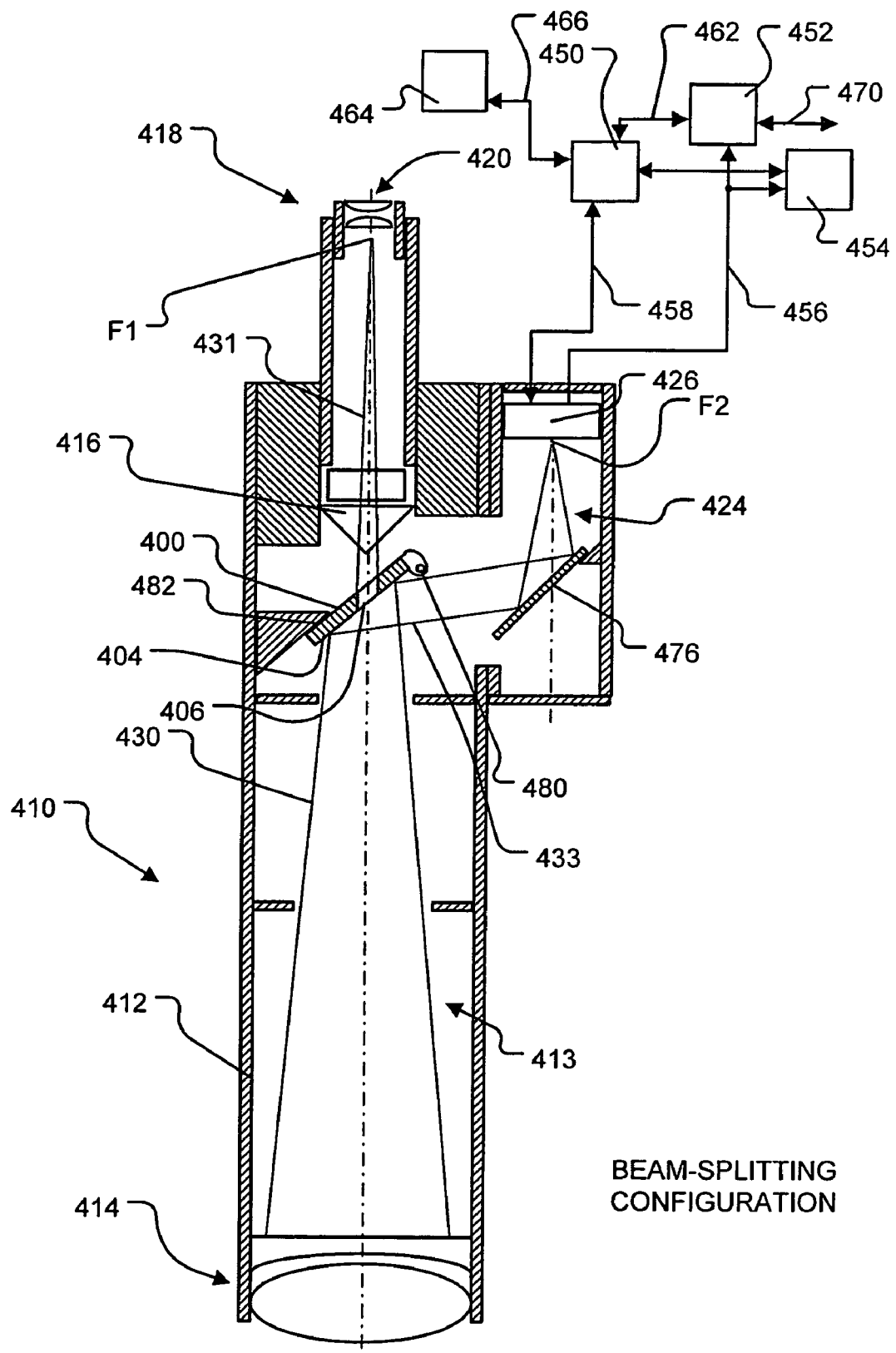
FIG. 5B is a schematic sectional view of the FIG. 5A digital imaging telescope in a beam-splitting configuration.

FIGS. 5A and 5B schematically depict a digital imaging telescope 410 according to another embodiment of the invention. Telescope 410 incorporates a beam splitter 400 of the type shown in FIGS. 2A-2C and 3A-3B. In some respects, telescope 410 of FIGS. 5A and 5B is similar to telescope 310 of FIGS. 4A and 4B. Features of telescope 410 that are similar to features of telescope 310 are accorded similar reference numerals, except that the features of telescope 410 are preceded by a reference numeral "4" rather than a reference numeral "3". For clarity, FIGS. 5A and 5B omit some components which are common in digital imaging systems. Telescope 410 may be switched between a non-beam-splitting configuration (FIG. 5A) and a beam-splitting configuration (FIG. 5B). In the beam-splitting configuration, beam splitter 400 is located in optical path 430 between objective lens 414 and eyepiece 418 and, in the non-beam-splitting configuration, beam splitter 400 is removed from optical path 430.

Telescope 410 is similar to telescope 310, except, as explained in more detail below, telescope 410 uses a single objective lens system 414 to provide light to eyepiece 418 and to digital imaging system 426. Telescope 410 does not have a secondary objective lens and shares light collected by objective lens system 414 between eyepiece 418 and digital imaging system 426. As with telescope 310, telescope 410 incorporates a telescope body 412 which defines a primary optical cavity 413. Primary optical cavity 413 houses objective lens system 414. Primary optical cavity 413 also houses optional erecting prism system 416 and eyepiece 418. Eyepiece 418 incorporates an eyepiece lens system 420 which provides a magnified image to a user's eye (not shown). Objective lens system 414, optional erecting prism system 416 and eyepiece lens system 420 of telescope 410 may be similar to objective lens system 314, optional erecting prism system 316 and eyepiece lens system 320 of telescope 310.

Telescope body 412 also defines a secondary optical cavity 424 which houses mirror 476 and digital imaging system 426. Mirror 476 of telescope 410 may be similar to mirror 376 of telescope 310 except that mirror 476 need not be moveable. Digital imaging system 426 of telescope 410 may be substantially similar to digital imaging system 326 of telescope 310. Telescope 410 may also incorporate controller 450, memory element(s) 452, video output display 454, user interface 464 and interfaces 456, 458, 462, 466 and 470 which are similar to controller 350, memory element(s) 352, video output display 354, user interface 364 and interfaces 356, 358, 362, 366 and 370 of telescope 310.

Telescope 410 uses a single objective lens system 414 to provide light to eyepiece 418 and to digital imaging system 426. Light sharing between eyepiece 418 and digital imaging system 426 is accomplished in telescope 410 using a moveable beam splitter 400 of the type shown in FIGS. 2A-2C and 3A-3B together with a mirror 476. Beam splitter 400 is moveable between a first, beam-splitting position corresponding to the beam-splitting configuration of telescope 410 (FIG. 5B) and a second, non-beam-splitting position corresponding to the non-beam-splitting configuration of telescope 410 (FIG. 5A). In its first, beam-splitting position, beam splitter 400 is located between objective lens system 414 and eyepiece 418 to intercept and split the light in optical path 430 and, in its second, non-beam-splitting configuration, beam splitter 400 is located outside of the light in optical path 430. When beam splitter 400 is in its beam-splitting position, beam splitter 400 cooperates with mirror 476 to direct light from objective lens system 414 to digital imaging system 426.

In the illustrated embodiment, beam splitter is pivotable between its beam-splitting and non-beam-splitting positions about pivot joint 480. However, the movement of beam splitter 400 between its beam-splitting and non-beam-splitting positions may generally be effected using any suitable technique, including (without limitation) actuator(s), mechanism(s), hand-actuatable mechanism(s) and/or biasing system(s) similar to those discussed above for the movement of beam splitter 300. Telescope 410 may incorporate an optional stop surface 482 that functions in a manner similar to stop surface 382 of telescope 382.

In the non-beam-splitting configuration of FIG. 5A, telescope 410 only provides light to eyepiece 418 on light path 430 and light is not available at digital imaging system 426. Light on path 430 travels through objective lens system 414 and is focused at point F1 in front of eyepiece lens system 420. Light on path 430 allows users to view objects through eyepiece 418. Because beam splitter 400 does not interfere with light on path 430 when telescope 410 is in its non-beam-splitting configuration, substantially all of the light collected by objective lens system 414 is focused at point F1 and is available to eyepiece 418 for observation by a user.

When telescope 410 is switched to its beam-splitting configuration (FIG. 5B), telescope 410 has two different light paths, both of which originate from objective lens system 414. Light collected by objective lens system 414 enters primary optical cavity 413 on light path 430. When light on path 430 impinges on beam splitter 400, a first portion of this light is transmitted through aperture 406 and continues on path 431 to focal point F1. Light on path 431 allows users to view objects through eyepiece 418. A second portion of the light on path 430 is reflected from reflective surface 404 of beam splitter 400 along path 433, where it is reflected again from mirror 476 before being focused at focal point F2. Light reflected from beam splitter 400 (along path 433) is used by imaging system 426 to digitize images.

Advantageously, as discussed above, the insertion of beam splitter 400 into optical path 430 and the withdrawal of beam splitter 400 from optical path 430 do not change the optical path length of the transmitted beam on path 431. The combined optical path length of the transmitted beam on paths 430 and 431 of the FIG. 5B beam-splitting configuration and the combined optical path length of the reflected beam on paths 430 and 433 of the FIG. 5B beam-splitting configuration are the same as the optical path length of light on path 430 in the FIG. 5A non-beam-splitting configuration. Because there is no change in the optical path length between the beam-splitting and non-beam-splitting configurations, neither eyepiece 418 nor digital imaging system 426 requires focal adjustment to accommodate transitions of telescope 410 back and forth between its beam-splitting configuration and its non-beam-splitting configuration.

When telescope 410 is in its beam-splitting configuration (FIG. 5B), digital imaging system 426 is capable of capturing and digitizing image data using light received from objective lens system 414 on paths 430 and 433. Digital imaging system 426 may provide digital image data to memory element 452 and/or to video output display 454, for example. In general, the total amount of light available to digital imaging system 426 will depend on the relative size of aperture 406 and reflecting surface 404 of beam splitter 400. For particular applications, the size ratio of aperture 406 and reflective surface 404 may be adjusted to suit the light requirements at digital imaging system 426.

Light is also provided to eyepiece 418 when telescope 410 is in either of its beam-splitting or non-beam splitting configurations. When telescope 410 is in its non-beam-splitting configuration, eyepiece 418 receives substantially all of the light collected by objective lens system 414 on path 430. When telescope 410 is in its beam-splitting configuration, eyepiece 418 receives the light transmitted by beam splitter 400 on path 431. The light transmitted by beam splitter 400 on path 431 is less than the amount of light received at eyepiece 418 when telescope 410 is in its non-beam splitting configuration. In general, the relative amount of light received at eyepiece 418 when telescope 410 is in its beam-splitting and non-beam-splitting configurations will depend on the relative size of aperture 406 and reflective surface 404 of beam splitter 400. For particular applications, the size ratio of aperture 406 and reflective surface 404 may be adjusted to suit the light requirements at eyepiece 418.

Telescope 410 does not incorporate a secondary objective lens (similar to secondary objective lens 322 of telescope 310) and, consequently, can be manufactured and sold less expensively than telescopes providing equivalent performance with two objective lenses.

As will be apparent to those skilled in the art in the light of the foregoing disclosure, many alterations and modifications are possible in the practice of this invention without departing from the spirit or scope thereof. For example:

Referring to FIGS. 3A and 3B, those skilled in the art will appreciate that objective lens 214 is not necessary for the operation of beam splitter 200. Even without objective lens 214, beam splitter 200 will still function to allow some light 218A to propagate through aperture 206 and will reflect some light 220 from reflective surface 204. In some embodiments, objective lens system 214 is replaced with collimating lens systems, light collection mirror systems or combinations of lenses and mirrors. Similarly, in some embodiments, objective lens systems 314, 414 of imaging systems 310, 410 may be replaced with collimating lens systems, light collection mirror systems or combinations of lenses and mirrors.

The description presented above assumes that beam splitters 200, 300 400 are deployed in air. This is not necessary. Beam splitters 200, 300, 400 may be used in other environments, such as in a liquid environment or an evacuated environment, for example.

In imaging systems 310, 410, mirrors 376, 476 are optional. Those skilled in the art will appreciate that light reflected from beam splitters 300, 400 may be provided directly to digital imaging systems 326, 426 without the use of mirrors 376, 476. In imaging system 300, a shutter, a lens cap or the like may be used in the place of mirror 376 to block light from secondary objective lens 322 in the beam-splitting configuration. In some applications, mirrors 376, 476 may be implemented by a plurality of mirrors and/or other optical elements.

In the description provided above, imaging systems 310, 410 are described as being telescopes, but this is not necessary. Imaging systems 310, 410 may generally comprise any imaging system having a need for a beam splitter of the type described in FIGS. 2A-2C and 3A-3B.

In the imaging systems 310, 410 described above, light collected by objective lens systems 314, 414 is converging before it impinges on beam splitters 300, 400. In some embodiments, the light that impinges on beam splitters 300, 400 is not converging. In such embodiments, the light reflected from and/or transmitted by beam splitters 300, 400 may be focused after reflection from or transmission by beam splitters 300, 400 to form images at the focal points of the reflected and/or transmitted beams. Typical imaging systems where light is focuses after reflection and/or transmission by beam splitter 300, 400 might include microscopes, for example.

In the imaging systems 310, 410 described above, light reflected from beam splitters 300, 400 is provided to digital imaging systems 326, 426 and light transmitted by beam splitters 300, 400 is provided to eyepieces 318, 418. Those skilled in the art will appreciate that imaging systems can be envisaged wherein light transmitted by beam splitters 300, 400 is provided to digital imaging systems 326, 426 and light reflected by beam splitters 300, 400 is provided to eyepieces 318, 418.

In some embodiments, the position of beam splitters 300, 400 may be monitored by one or more suitable position sensor(s). In such embodiments, controllers 350, 450 may obtain feedback from the position sensor(s) and cause corresponding actuator(s) to controllably move beam splitters 300, 400 and/or mirror 376 between their beam-splitting and non-beam-splitting positions. In some embodiments, one or more limit sensors may be used to stop the movement of beam splitters 300, 400 and/or mirror 376 once the beam splitters and/or mirror have reached their beam-splitting and/or non-beam-splitting position. Such limit sensors can be positioned at or adjacent to stop surfaces 382, 384, 482.

The description presented above uses the term "light" to describe electromagnetic radiation. In general, the invention described herein is applicable to electromagnetic radiation of any suitable wavelength including wavelengths that are outside of the visible spectrum. The term "light" should be understood to include all such electromagnetic radiation.

Accordingly, the scope of the invention is to be construed in accordance with the substance defined by the following claims.

What is claimed is:

1. A beam splitter positionable to intercept light in an optical path, the beam splitter comprising:
   a body penetrated by an aperture; and
   a reflective surface surrounding the aperture, wherein a transmitted portion of the light in the optical path is transmitted through the aperture and a reflected portion of the light in the optical path is reflected from the reflective surface;
   wherein the body comprises one or more edges which define the aperture and wherein each of the edges is beveled with respect to the plane of the reflective surface such that when the beam splitter is positioned to intercept light in the optical path the reflective surface is oriented at a non-orthogonal angle with respect to an optical axis of the optical path and each of the one or more edges is oriented parallel to the optical axis.

2. A beam splitter according to claim 1 wherein the non-orthogonal angle between a plane of the reflective surface and the optical axis of the optical path is 45°.

3. A beam splitter according to claim 1 wherein when the beam splitter is positioned to intercept the light in the optical path and the reflective surface is oriented at the non-orthogonal angle with respect to the optical axis of the optical path, the optical axis of the optical path is coincident with a central axis of the aperture.

4. A beam splitter according to claim 1 wherein an optical reflectance of the reflective surface is greater than 80% for light having wavelengths over at least 80% of a range of 400-700 nanometers.

5. A beam splitter according to claim 1 wherein a ratio of a cross-sectional area of the aperture to a surface area of the reflective surface is in a range of 1:20 (5%) to 1:3 (33%).

6. An optical imaging system comprising a beam splitter according to claim 1 and an input optical system for collecting light from a scene and directing the light from the scene onto the optical path.

7. An optical imaging system according to claim 6 wherein the transmitted portion of the light forms a first image of the scene and wherein the reflected portion of the light forms a second image of the scene.

8. An optical imaging system according to claim 7 wherein the input optical system comprises at least one of: an objective lens system, a concave mirror; and a collimating lens system.

9. An optical imaging system according to claim 7 wherein the input optical system is operative to cause the light on the optical path to converge.

10. An optical imaging system according to claim 9 wherein the transmitted portion of the light converges to form the first image of the scene at a first focal plane incorporating a first focal point and the reflected portion of the light converges to form the second image of the scene at a second focal plane incorporating a second focal point.

11. An optical imaging system according to claim 10 wherein a first optical path length from the input optical system to the first focal point is substantially the same as a second optical path length from the input optical system to the beam splitter and from the beam splitter to the second focal point.

12. An optical imaging system according to claim 10 comprising a digital imaging system located to sense at least one of the first and second images and to provide digital data representing the sensed image.

13. An optical imaging system according to claim 10 comprising an eyepiece optical system located to receive at least one of the first and second images and to provide a reproduced image to an eyepiece.

14. An optical imaging system according to claim 13 comprising an erecting prism system interposed between the input optical system and the eyepiece optical system.

15. An optical imaging system according to claim 7 wherein the reflective surface comprises a front surface mirror.

16. A beam splitter according to claim 1 wherein the aperture that penetrates the body is the only aperture that penetrates the body in a region of the reflective surface and wherein the aperture is centrally located in the region of the reflective surface.

17. A beam splitter according to claim 16 wherein when the beam splitter is positioned to intercept the light in the optical path and the reflective surface is oriented at the non-orthogonal angle with respect to the optical axis of the optical path, the optical axis of the optical path is coincident with a central axis of the aperture.

18. An optical imaging system comprising:
a beam splitter positionable to intercept light in an optical path, the beam slitter comprising: a body penetrated by an aperture; and a reflective surface surrounding the aperture, wherein a transmitted portion of the light in the optical path is transmitted through the aperture and a reflected portion of the light in the optical path is reflected from the reflective surface;
an input optical system for collecting light from a scene and directing the light from the scene onto the optical path, the input optical system operative to cause the light on the optical path to converge; and
a mechanism for selectively moving the beam splitter to a non-beam-splitting position outside of the optical path;
wherein the transmitted portion of the light forms a first image of the scene and wherein the reflected portion of the light forms a second image of the scene;
wherein the transmitted portion of the light converges to form the first image of the scene at a first focal plane incorporating a first focal point and the reflected portion of the light converges to form the second image of the scene at a second focal plane incorporating a second focal point; and
wherein a first optical path length from the input optical system to the first focal point is substantially the same as a second optical path length from the input optical system to the beam splitter and from the beam splitter to the second focal point.

19. An optical imaging system according to claim 18 wherein, when the beam splitter is in the non-beam-splitting position, substantially all of the light directed onto the optical path by the input optical system converges to form a third image of the scene at the first focal plane.

20. An optical imaging system according to claim 19 comprising a digital imaging system having a single focal length and located to sense the first image and to provide digital data representing the first image when the beam splitter is positioned to intercept light in the optical path and to sense the third image and to provide digital data representing the third image when the beam splitter is in the non-beam-splitting position.

21. An optical imaging system according to claim 19 comprising an eyepiece optical system having a single focal length and located to receive the first image when the beam splitter is positioned to intercept light in the optical path and to receive the third image when the beam splitter is in the non-beam-splitting position and to provide a reproduced image to an eyepiece.

22. An optical imaging system according to claim 21 comprising an erecting prism system interposed between the input optical system and the eyepiece optical system.

23. An optical imaging system comprising:
a primary input optical system operative to collect light from a scene and to direct the light onto an input optical path; and
a beam splitter which is moveable to a beam-splitting position where the beam splitter intercepts the light on the input optical path and a non-beam-splitting position where the beam splitter is located outside of the input optical path;
wherein the beam splitter comprises a body penetrated by an aperture and a reflective surface surrounding the aperture and wherein, when the beam splitter is located in the beam-splitting position, a transmitted portion of the light in the optical path is transmitted through the aperture and a reflected portion of the light in the optical path is reflected from the reflective surface.

24. An optical imaging system according to claim 23 wherein the beam splitter body comprises one or more edges which define the aperture and at least a portion of each edge is beveled with respect to a plane of the reflective surface.

25. An optical imaging system according to claim 23 wherein when the beam splitter is in the beam-splitting position, the one or more edges are parallel with an optical axis of the input optical path and a plane of the reflective surface forms a non-orthogonal angle with the optical axis of the input optical path.

26. An optical imaging system according to claim 25 wherein when the beam splitter is in the beam-splitting position, the optical axis of the input optical path is aligned with a central axis of the aperture.

27. An optical imaging system according to claim 25 wherein the input optical system causes light on the input optical path to converge such that, when the beam splitter is in the beam-splitting position, the transmitted portion of the light forms a first image of the scene at a first focal plane incorporating a first focal point and the reflected portion of the light forms a second image of The scene at a second focal plane incorporating a second focal point and, when the beam splitter is in the non-beam-splitting position, the light on the input optical path forms a third image of the scene at a third focal plane incorporating a third focal point.

28. An optical imaging system according to claim 27 wherein the first and third focal planes are the same.

29. An optical imaging system according to claim 27 wherein a first optical path length from the input optical system to the first focal point, a second optical path length from the input optical system to the beam splitter and from the beam splitter to the second focal point and a third optical path length from the input optical system to the third focal point are all substantially the same.

30. An optical imaging system according to claim 29 comprising a digital imaging system located to sense at least one of the first and second images and to provide digital image data representing the sensed image.

31. An optical imaging system according to claim 30 comprising an eyepiece optical system located to receive one of the first and second images and to provide a reproduced image to an eyepiece at the same time that the digital imaging system is sensing and providing digital image data representing the other one of the first and second images.

32. An optical imaging system according to claim 27 comprising a digital imaging system having a single focal length located to sense and provide digital image data representing the first image when the beam splitter is in the beam-splitting position and to sense and provide digital image data representing the third image when the beam splitter is in the non-beam-splitting position.

33. An optical imaging system according to claim 32 comprising an eyepiece optical system located to receive the second image when the beam splitter is in the beam-splitting position and to provide a reproduced image to an eyepiece.

34. An optical imaging system according to claim 27 comprising an eyepiece optical system having a single focal length located to receive the first image when the beam splitter is in the beam-splitting position and to receive the third image when the beam splitter is in the non-beam-splitting position and to provide a reproduced image to an eyepiece.

35. An optical imaging system according to claim 34 comprising a digital imaging system located to sense and provide digital image data representing the second image when the beam splitter is in the beam-splitting position.

36. An optical imaging system according to claim 27 comprising a secondary input optical system operative to collect light from the scene, to direct the collected light onto a secondary optical path and to cause the light on the secondary optical path to converge to form a fourth image of the scene at a fourth focal plane incorporating a fourth focal point.

37. An optical imaging system according to claim 36 wherein the fourth focal plane and the second focal plane are the same.

38. An optical imaging system according to claim 37 comprising a movable member which is moveable between a first position where the member blocks light on the secondary optical path when the beam splitter is in the beam-splitting position and a second position where the member is located outside of the secondary optical path when the beam splitter is in the non-beam-splitting position.

39. An optical imaging system according to claim 38 wherein the moveable member comprises a reflective surface and wherein, when the moveable member is located in the first position, the reflective surface of the member further reflects the reflected portion of the light which has already been reflected by the beam splitter.

40. A method for providing images of a scene in more than one location, the method comprising:
    collecting light from the scene and directing the light onto an optical path;
    causing the light in the optical path to converge toward a first focal point to provide a first image of the scene at the first focal point;
    when an image of the scene is required at a second location: moving an apertured reflective surface into the optical path; causing a portion of the light in the optical path to reflect from the reflective surface and to converge toward a second focal point to provide a second image of the scene at the second focal point; and allowing a portion of the light in the optical path to pass through the aperture in the reflective surface and to converge toward the first focal point to provide a third image of the scene at the first focal point.

* * * * *